(12) United States Patent
Yohe et al.

(10) Patent No.: US 9,545,725 B2
(45) Date of Patent: Jan. 17, 2017

(54) ARTICLE GRIPPING DEVICE

(71) Applicant: DYCO, INC., Bloomsburg, PA (US)

(72) Inventors: Peter D. Yohe, Bloomsburg, PA (US); Thomas M. Zurewich, Orangeville, PA (US)

(73) Assignee: Dyco, Inc., Bloomsburg, PA (US)

( * ) Notice: Subject to any disclaimer, the term of this patent is extended or adjusted under 35 U.S.C. 154(b) by 103 days.

(21) Appl. No.: 14/700,905

(22) Filed: Apr. 30, 2015

(65) Prior Publication Data

US 2016/0318189 A1 Nov. 3, 2016

(51) Int. Cl.
*B25J 15/02* (2006.01)
*B25J 15/00* (2006.01)

(52) U.S. Cl.
CPC ......... *B25J 15/0028* (2013.01); *B25J 15/0052* (2013.01); *B25J 15/0206* (2013.01)

(58) Field of Classification Search
CPC . B25J 15/0028; B25J 15/0052; B25J 15/0206; B25J 15/024; B65B 21/18; B65B 21/20; B65G 47/907; B66C 1/427; B66C 1/447; Y10S 901/37
USPC ............................. 294/87.1, 198; 414/796.9
See application file for complete search history.

(56) References Cited

U.S. PATENT DOCUMENTS

| | | | | | |
|---|---|---|---|---|---|
| 4,300,330 | A | * | 11/1981 | Hartness | B65B 21/04 294/87.24 |
| 4,603,896 | A | * | 8/1986 | Vasseur | B65G 47/90 294/119.1 |
| 4,807,917 | A | * | 2/1989 | Bunting | B65B 21/18 294/118 |
| 5,060,455 | A | * | 10/1991 | Schmeisser | B65B 21/18 53/247 |
| 8,894,114 | B2 | * | 11/2014 | Fahldieck | B65G 47/847 198/407 |
| 2003/0168873 | A1 | * | 9/2003 | Lanfranchi | B65B 21/18 294/87.1 |
| 2010/0201143 | A1 | * | 8/2010 | Ehnes | B25J 9/142 294/198 |
| 2012/0286531 | A1 | * | 11/2012 | Hajrovic | B25J 15/0206 294/192 |

\* cited by examiner

*Primary Examiner* — Dean Kramer
(74) *Attorney, Agent, or Firm* — McNees Wallace & Nurick LLC

(57) ABSTRACT

An article gripping device including a pair of jaws including at least one movable jaw. The jaws of the pair of jaws are movable relative to each other between a first position for gripping an article and a second position associated with release of the article. The at least one movable jaw has at least two forms of actuation to achieve the first position and the second position.

19 Claims, 11 Drawing Sheets

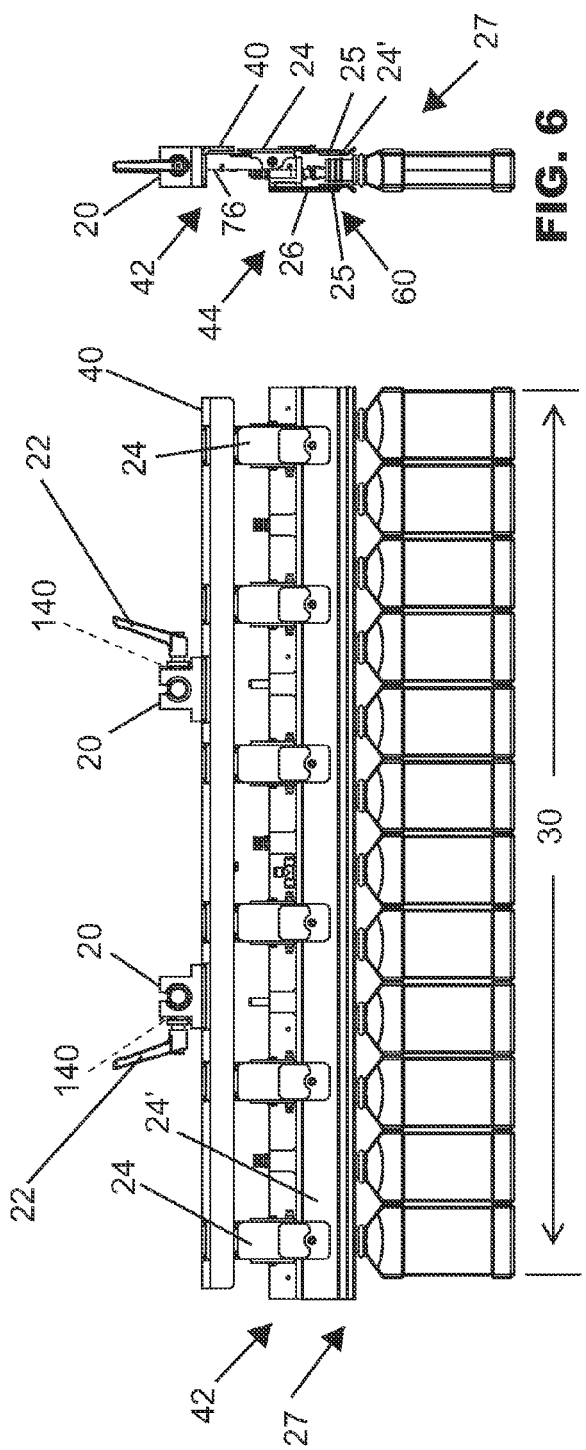
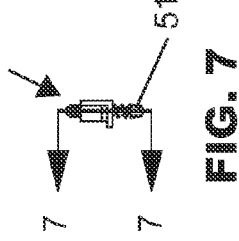
FIG. 6
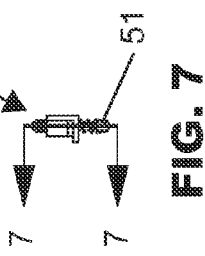
FIG. 7
FIG. 5
FIG. 8

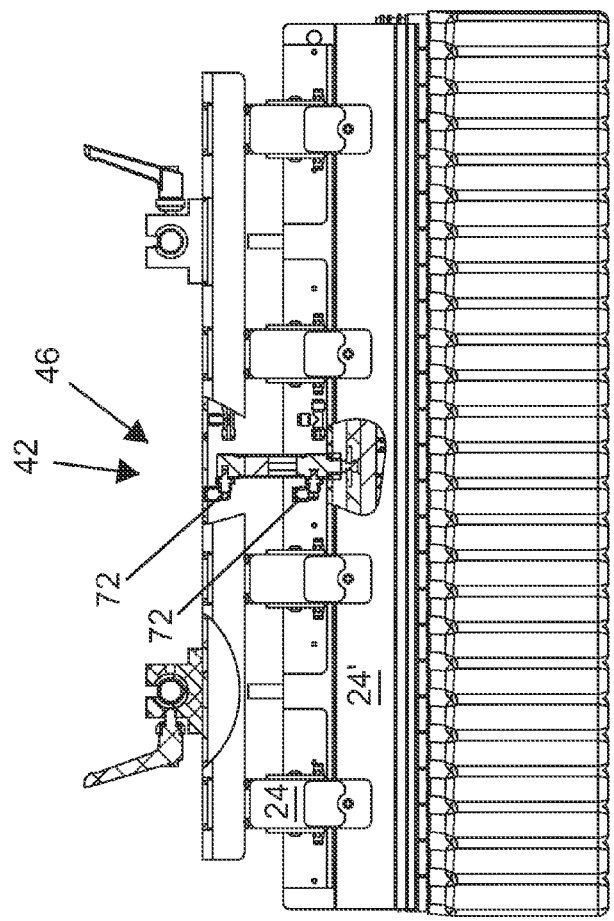
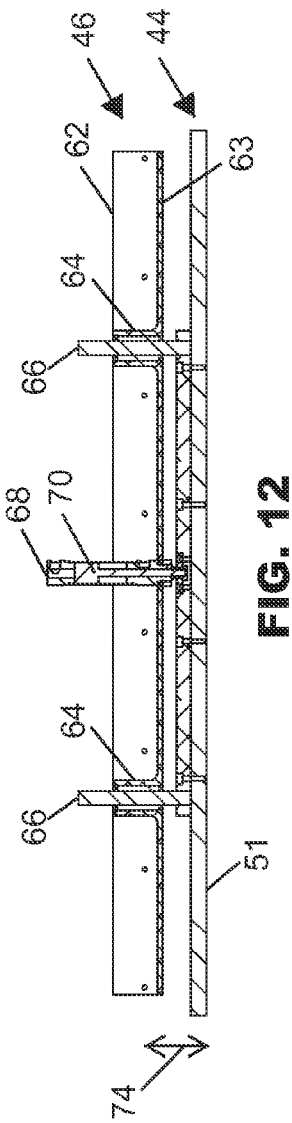
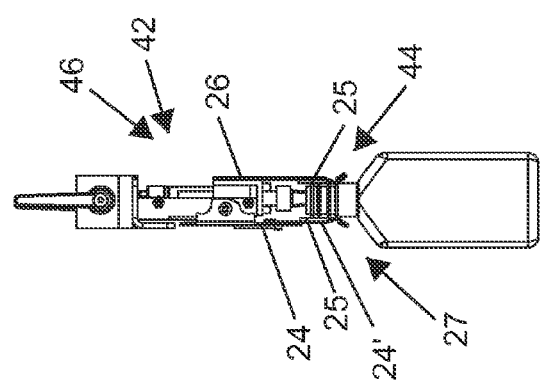
FIG. 9
FIG. 10
FIG. 11
FIG. 12

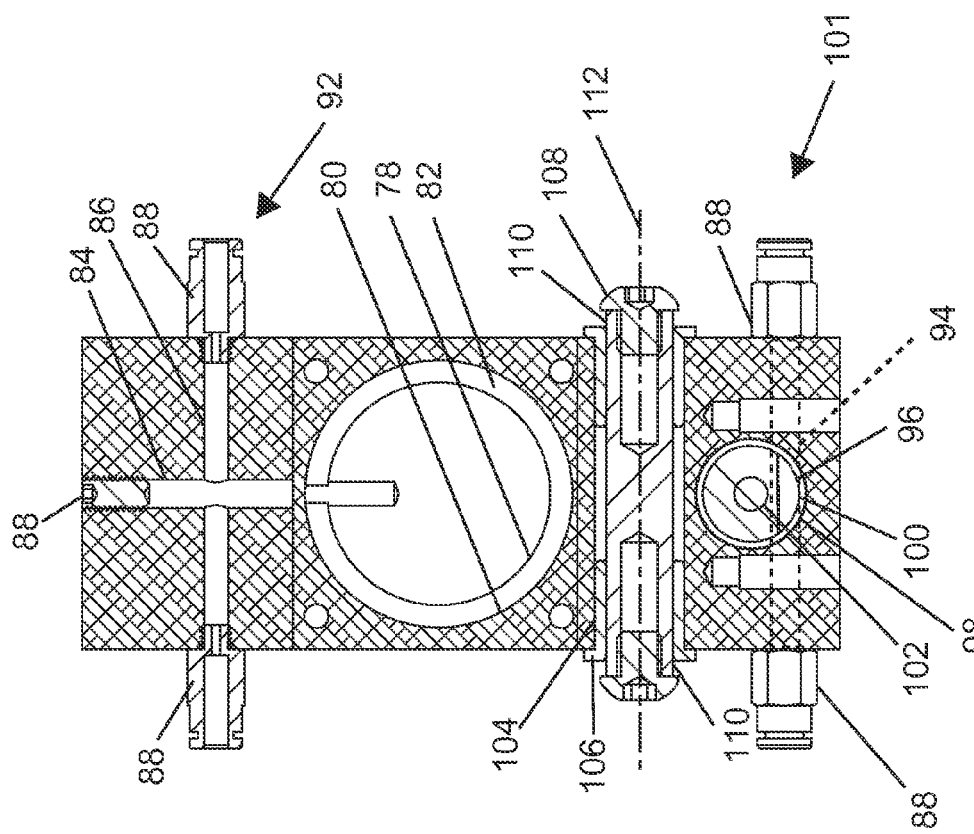
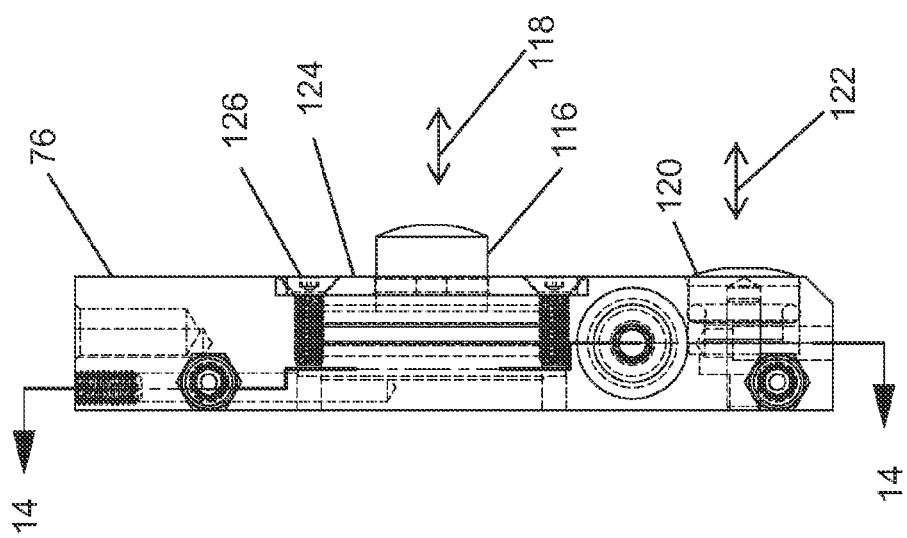
FIG. 14
FIG. 13

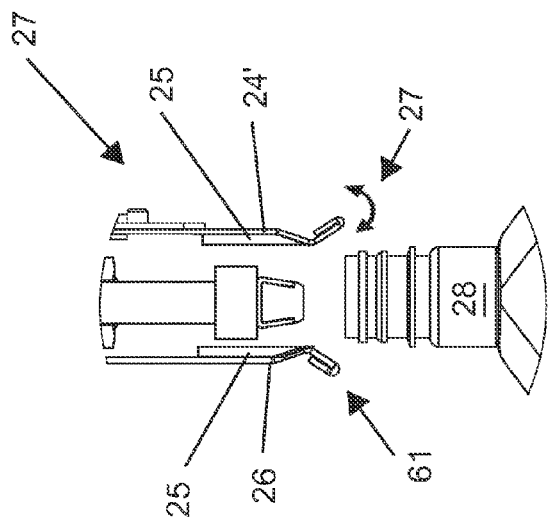
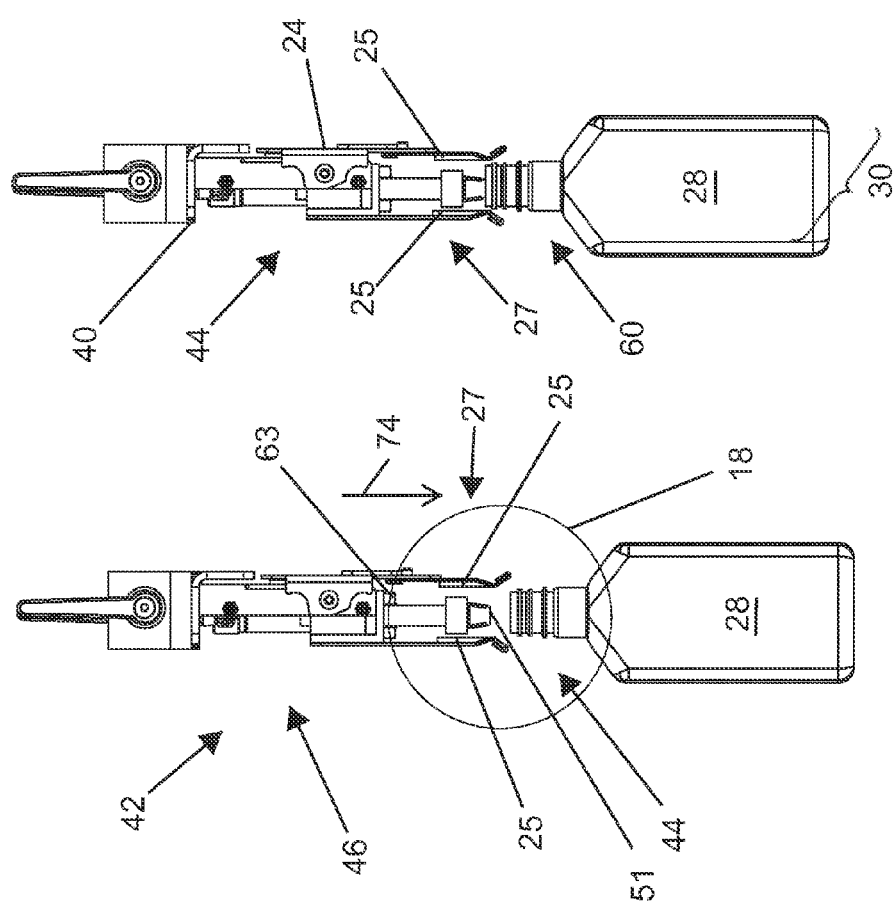

ARTICLE GRIPPING DEVICE

FIELD OF THE INVENTION

The present invention is directed to an article gripping device for picking and placing articles.

BACKGROUND OF THE INVENTION

When large numbers of stackable articles must be transported in large quantities to another location, especially when the article is small, the article may be packaged in a container to protect the article during shipping of the container. Alternately, to reduce the amount of handling required and/or to reduce the amount of shipping material consumed, the articles may be arranged in a tight grouping, or array of articles. Each array of articles can form a layer of articles that can be stacked on a pallet or a box having a footprint which can be accommodated by freight hauling compartments, e.g., for truck, rail, sea or air vessels.

Palletizing articles is becoming increasingly automated in manufacturing facilities, wherein articles are moved via a conveyor, which articles are manipulated by dedicated machinery onto pallets.

Assembly of article arrays is currently performed using conventional bulk palletizers. Most conventional bulk palletizers build the complete article array or bulk array or article layer and then move or "sweep" the completed array layer or bulk array into position onto the finished pallet stack. Palletizing robots are also used, but most palletizing robots also move the completed article layer or bulk array onto the finished pallet stack. Alternately, the palletizing robots construct an article array by placing individual rows of articles to form the array onto the finished pallet stack.

The current state of the art of bulk palletizers suffers from several deficiencies. For example, articles have a tendency to adhere to the jaws of the article gripping devices of the bulk palletizers. As a result, reliability and stability of article placement in a container or on a pallet may be compromised. In addition, conventional article gripping devices of the bulk palletizers may be incapable of placing or arranging arrays of small articles inside of a container such that the array remains stable inside of the container. This instability may be due to the footprint of the article gripping devices being sufficiently greater than the footprint of the articles. Further, in the event the arrangement of articles must be changed, for reasons such as a change of footprint size of the articles, tooling specific to the new arrangement and special realignment is typically required. Still further, jaws of article gripping devices of conventional bulk palletizers typically apply a different magnitude of compressive force along the length of the jaws, which may result in the inability of arranging articles along the entire length of the jaws.

It would therefore be beneficial to develop and use an article gripping device that does not suffer from the above-mentioned deficiencies, thereby reducing cost of operation and increasing reliability.

SUMMARY OF THE INVENTION

The disclosure is directed to an article gripping device including a pair of jaws including at least one movable jaw. The jaws of the pair of jaws are movable relative to each other between a first position for gripping an article and a second position associated with release of the article. The at least one movable jaw has at least two forms of actuation to achieve the first position and the second position.

The disclosure is also directed to an article gripping system for releasably manipulating a row of articles from a first position to a second position inside of a container. The article gripping system includes an article gripping device including a pair of jaws including at least one movable jaw, the jaws of the pair of jaws movable relative to each other between the first position for gripping a row of articles and the second position associated with release of the row of articles. The at least one movable jaw has at least two forms of actuation to achieve the first position and the second position. Upon application of a compressive force to the at least one movable jaw by the at least two forms of actuation, the compressive force applied to the row of articles by the pair of jaws in the first position is a distributed force.

The disclosure is further directed to a method for accommodating an article array formed of a plurality of rows of articles by an article gripping system, in which rearrangement of portions of the article gripping system is required. The method further includes providing the article gripping system including an article gripping device including a pair of jaws including at least one movable jaw, the jaws of the pair of jaws movable relative to each other between the first position for gripping a row of articles and the second position associated with release of the row of articles. The method further includes securing a reference bar to the article gripping device, the reference bar having an alignment feature for precisely positioning each corresponding row of articles of the plurality of rows of articles of the article array, which precise positioning being achievable without tools.

The present invention, by making use of a compact article gripping device having a stabilizer and providing a distributed job gripping force, results in more reliable operation. The article gripping device can be used to install arrays of smaller articles inside of a container, which arrays remaining stable inside of the container after the array is released by the article gripping device. In addition, the arrangement or spacing of article gripping devices relative to one another, such as in response to a change in the size of the articles, can be achieved with a high degree of precision without the use of tools. The article gripping device and article gripping system, which includes the article gripping device, each also maintains control of the articles, preventing the articles from moving out of position or from tipping.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 5 is a front view of an exemplary article gripping device.

FIG. 6 is a side view of the article gripping device of FIG. 5, including a pair of jaws in a first position.

FIG. 7 is a side view of a portion of an exemplary stabilizer.

FIG. 8 is a cross section of the stabilizer portion taken along line 7-7 of FIG. 7.

FIG. 9 is a cutaway front view of an exemplary article gripping device.

FIG. 10 is a side view of the article gripping device of FIG. 9.

FIG. 11 is a side view of a portion of an exemplary stabilizer.

FIG. 12 is a cross section of the stabilizer portion taken along line 12-12 of FIG. 11.

FIG. 13 is a side view of a body of an exemplary article gripping device.

FIG. 14 is a cross section taken along line 14-14 of the article gripping device of FIG. 13.

FIG. 17 is a side view of an exemplary article gripping device.

FIG. 18 is a side view of an exemplary article gripping device.

FIG. 19 is an enlarged partial side view of the article gripping device taken along region 18 of FIG. 17, including a pair of jaws in a second position.

DETAILED DESCRIPTION OF THE INVENTION

Figure 1:
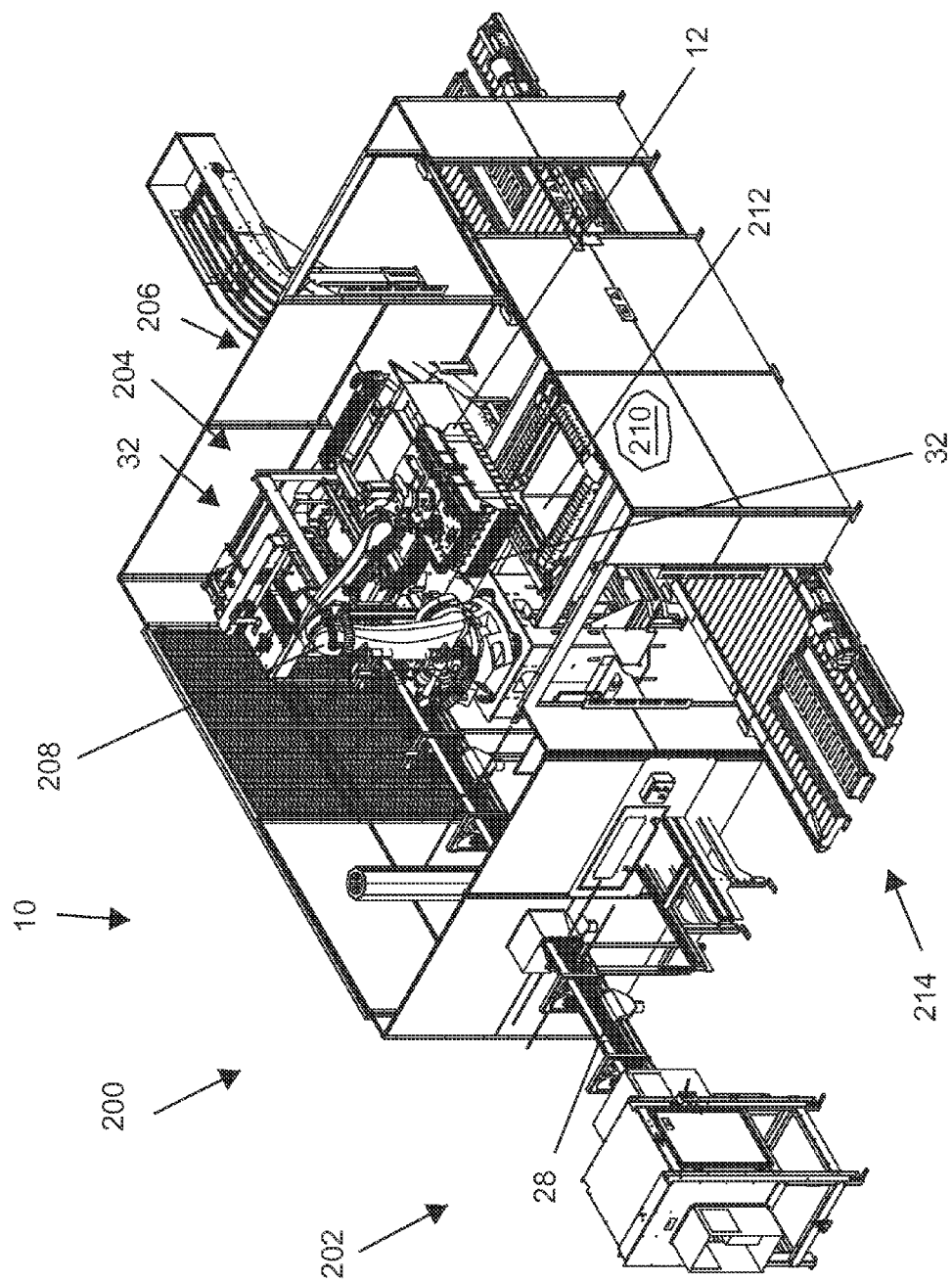
FIG. 1 is an upper perspective view of an exemplary palletizer, the automated system showing the different stations or areas.

Referring to FIG. 1, an automated palletizer system or palletizer 200 utilizing an article gripping system 10 is shown. Article gripping system 10 includes an article gripping device 12. Palletizer 200 includes an article infeed 202 for providing articles 28, such as bottles to palletizer 200, and an article array forming area 204 forming an article array 32 that is picked up by article gripping device 12. Palletizer 200 further includes a waste/reject area 206, such as for articles 28 that have tipped. An article array loading device 208, such as an anthropomorphic robotic arm, as controlled by article gripping system 10, manipulates article gripping device 12 that moves article arrays 32 between article array forming area 204 and a container 210. Article gripping device 12 is inserted inside an opening 212 of container 210, whereupon the article array is released. Article gripping device 12 continues to move article arrays 32 from article array loading device 208 to container 210 until container 210 is sufficiently filled, whereupon the loaded container is moved to a container loading/unloading area 214.

As used herein, the term "article gripping device" is used irrespective the number of articles being gripped, moved or otherwise manipulated. In other words, the term "article gripping device" is used irrespective a single article 28 (FIG. 4), a row of articles or article row 30 (FIG. 4) or an array of articles or article array 32 (FIG. 4) is being gripped, moved or otherwise manipulated. The terms "gripped" and "manipulated" in the context of the interaction between the article gripping device and the article(s) may be used interchangeably.

Figure 2:
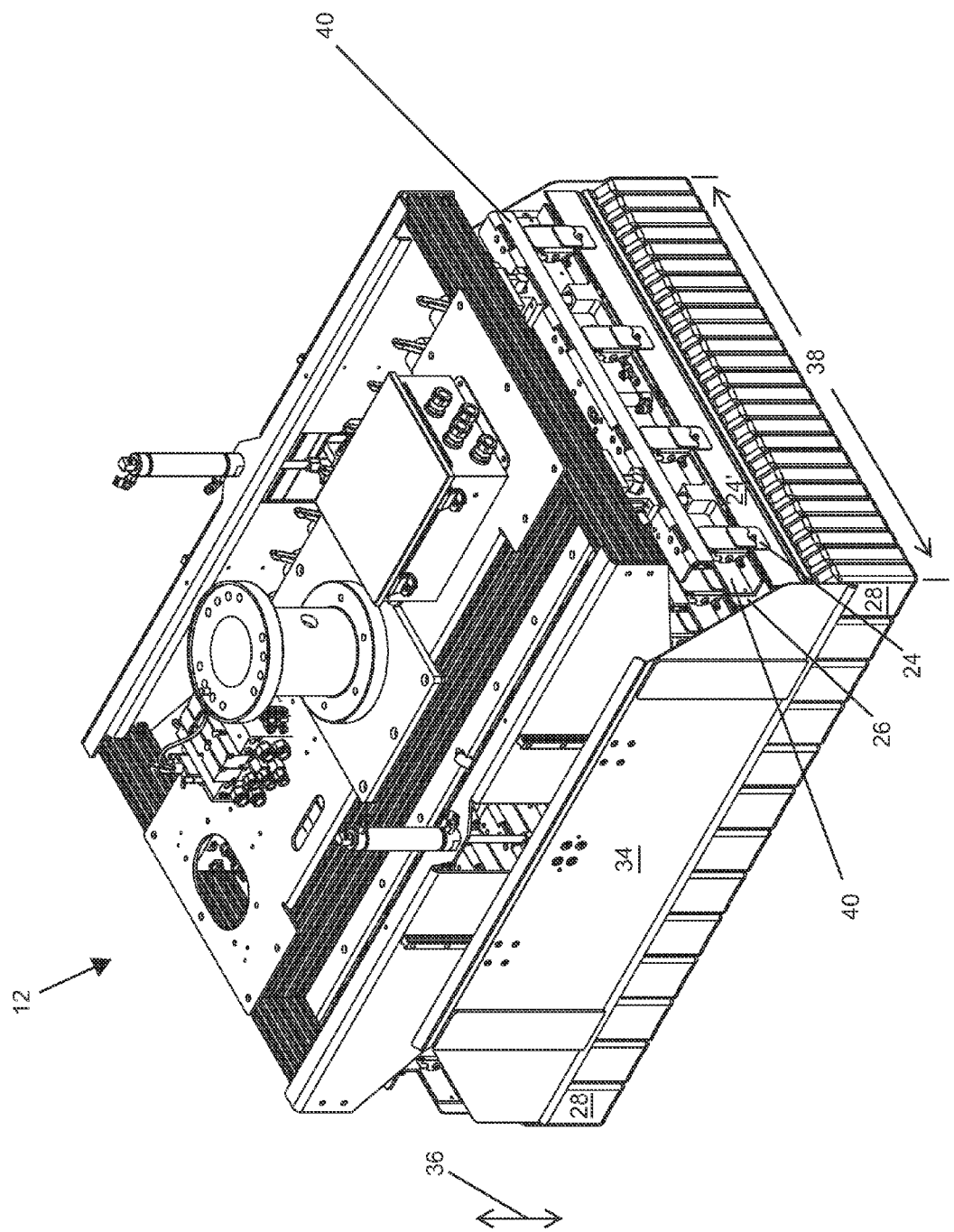
FIG. 2 is an upper perspective view of an exemplary article gripping device.
Figure 3:
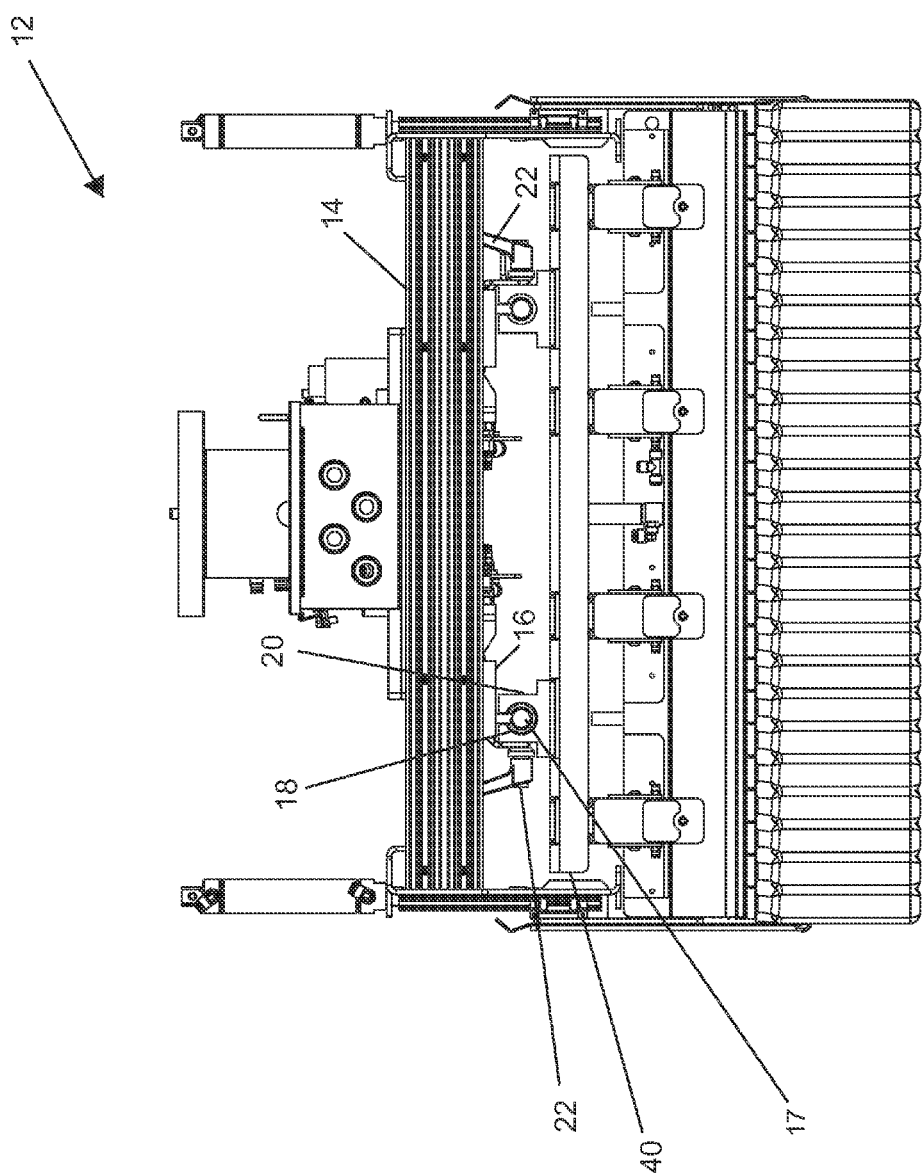
FIG. 3 is a side view of a cutaway of the article gripping device of FIG. 2.
Figure 4:
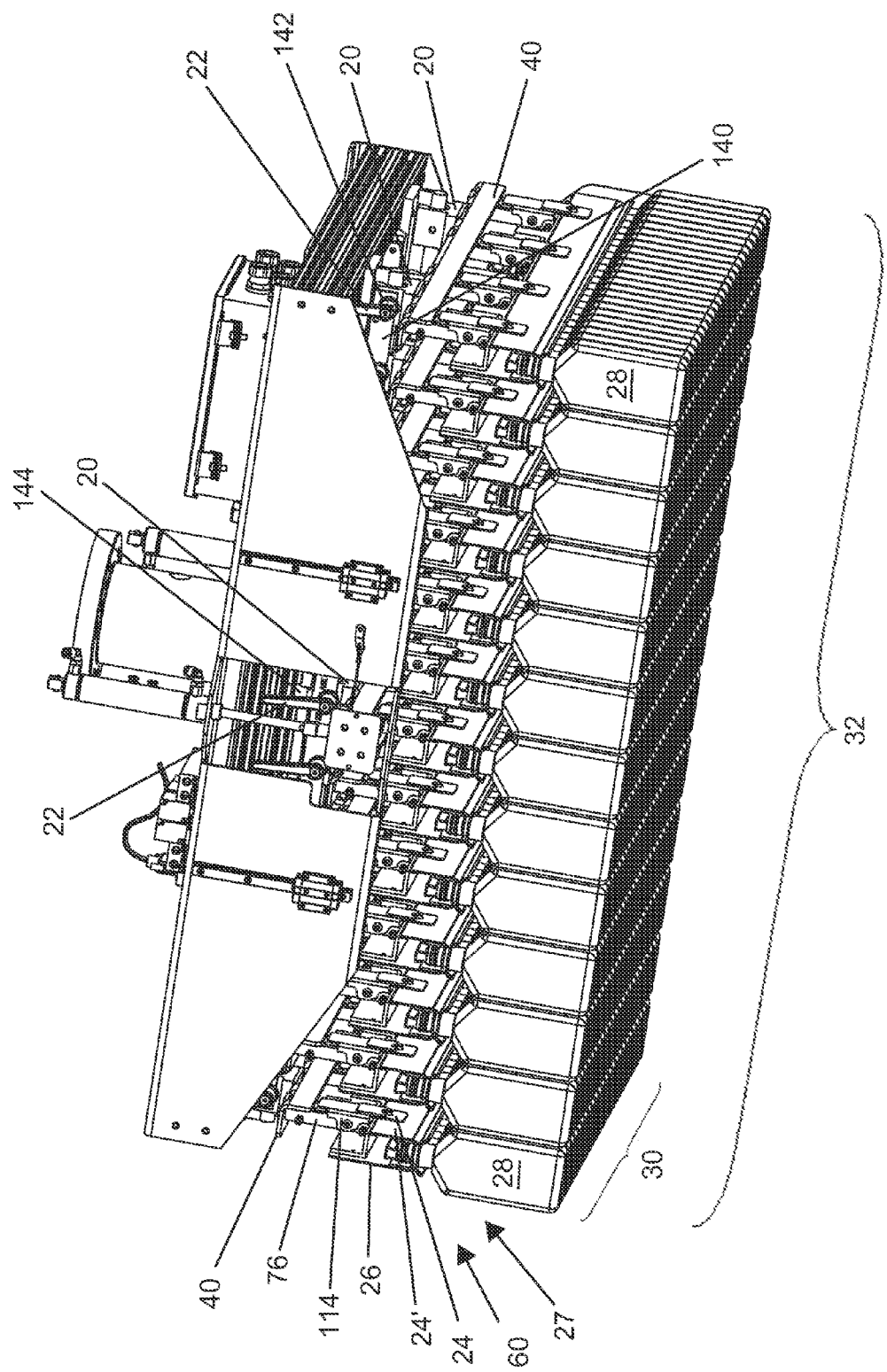
FIG. 4 is a lower perspective view of the article gripping device of FIG. 3.

Referring to FIGS. 2-4, article gripping device 12 is shown manipulating an array of articles 28 or article array 32, which article array 32 includes a plurality of rows of articles or article rows 30. Each of article array 32 and article rows 30 include a plurality of articles 28. As further shown in FIG. 4, article gripping device 12 includes a plurality of pairs of jaws 27. Each pair of jaws 27 includes a jaw 24 and an corresponding jaw 26 relative to each other between a first position 60 for gripping an article 28 or a plurality of articles (FIGS. 4, 6) and a second position 61 associated with release of the article 28 or a plurality of articles (FIG. 19; taken from region 18 of FIG. 17). In one embodiment, jaw 24 is movable or selectively movable relative to jaw 26 of pair of jaws 27. In another embodiment, each jaw 24, 26 of pair of jaws 27 is movable relative to the other jaw. Jaw 24 includes wall portion 24' that may extend so as to interconnect one or more jaws 24 such that pair of jaws 27 can grip one or more articles 28, including a row or articles or article row 30. As further shown in FIG. 6, a resilient layer 25 is secured to each jaw 24, 26 of the pair of jaws 27. As further shown in FIGS. 4-6, and as will be further discussed, the article gripping device includes a body 76 that is movably secured to jaw 24, which body 76 is also secured to a stabilizer 42. Other configurations and layouts or arrangements of the article gripping device may also be used, so long as at least one of the jaws of the pair of jaws is movable relative to the other jaw of the pair of jaws.

As shown in FIGS. 2-4, article gripping device 12 includes a frame 14 that is secured to one or more guides 16 (a pair of guides 16 is shown in FIG. 3). Each guide 16 includes a guide portion 18 for slidably securing a corresponding mounting block 20 there to, each mounting block 20 including a position locking handle 22 for selectively securing mounting block 20 in a fixed position relative to a corresponding guide portion 18. In one embodiment, position locking handle 22 has a ratcheting feature. As further shown in FIGS. 3 and 4, pairs of mounting blocks 20 are each secured to a corresponding support member, such as an angle 40. In another embodiment, a different number of mounting blocks 20 may be utilized to secure a corresponding angle 40. As further shown in FIGS. 5 and 6, as a result of sufficiently loosening each position locking handle 22 secured to a corresponding angle 40, pair of jaws 27, including a plurality of jaws 24, is slidably movable along guide portions 18 (FIG. 3). Position locking handles 22 permit precise positioning of the pair of jaws 27 relative to guide portion 18. As will be discussed in further detail below, a plurality of jaws 24 provide a distributed force for improved performance related to gripping a plurality of articles 28, such as article row 30.

Referring to FIGS. 5-12, a stabilizer 42 may be utilized to provide improved gripping, manipulation and release of articles 28. As more clearly shown in FIGS. 6-8, stabilizer 42 includes a stabilizer portion 44 having a guide plate 48 (FIG. 8). Stabilizer portion 44 is shown positioned between pair of jaws 27 (FIG. 6). Guide plate 48 includes a plurality of protrusions 50, 52 which are each configured to slidably receive respective pins 54 and headed fasteners 56. Pins 54 extend through openings formed in corresponding protrusions 50 of guide plate 48 and are each secured to a bar 51 extending longitudinally and substantially parallel to guide plate 48. As a result of the arrangement of pins 54 and the openings formed in protrusions 50, bar 51 is constrained in movement directions 49 that are substantially perpendicular to guide plate 48, and also substantially perpendicular to a rotational axis 112 of jaw 24 (FIG. 16), as will be discussed in additional detail below. Headed fasteners 56 extend through openings formed in corresponding protrusions 52 of guide plate 48 and are each secured to bar 51 extending longitudinally and substantially parallel to guide plate 48.

As further shown in FIG. 8, a form of actuation 58, such as helical springs extend along the shanks of fasteners 56, the springs or forms of actuation 58 remaining in a partially compressed state between the heads of corresponding fasteners 56 and bar 51. The springs or forms of actuation 58 apply increased retention forces to guide plate 48 and bar 51 in response to guide plate 48 and bar 51 being directed toward each other in movement direction 49. As a result of the springs or forms of actuation 58, bar 51 is collectively resiliently movable only in movement direction 49 that is substantially perpendicular to rotational axis 112 of jaw 24 (FIG. 16), maintaining bar 51 substantially parallel to guide plate 48. By virtue of such resilient movement, ends of articles brought into aligning contact with bar 51 while articles 28 are gripped by pair of jaws 27, both in preparation of movement and during movement of the articles by the article gripping device, the articles are subjected to a resilient, stabilizing force that helps maintain the articles in an aligned position, resulting in improved, more reliably controlled handling of the articles. That is, the tendency for angular movement of the articles relative to the bar, i.e., "swinging" of the articles, is reduced as a result of such constrained resilient movement. In another embodiment, the form of activation 58 may be a pressurized fluid or other suitable form of actuation.

Referring to FIGS. 9-12, stabilizer 42 is further discussed. Further referring to FIG. 9, a partial cutaway of stabilizer 42 and a stabilizer portion 46 is shown. Stabilizer portion 46 may be utilized to provide improved release of articles 28 or separation of articles 28 from the article gripping system. As more clearly shown in FIGS. 11-12, stabilizer 42 includes a stabilizer portion 46 having a guide plate 62 (FIG. 12). Stabilizer portion 46 is shown positioned between pair of jaws 27 (FIG. 10). Guide plate 62 includes a plurality of protrusions 64, each protrusion 64 is configured to slidably receive respective pins 66. Pins 66 extend through openings formed in corresponding protrusions 64 of guide plate 62 and are each secured to stabilizer portion 44, including bar 51 (FIG. 12) extending longitudinally and substantially parallel to guide plate 62. As a result of the arrangement of pins 66 and the openings formed in protrusions 64, bar 51 is constrained in movement directions 74 (FIG. 12) that are substantially perpendicular to guide plate 62, and also substantially perpendicular to a rotational axis 112 of jaw 24 (FIG. 16), as will be discussed in additional detail below.

A form of actuation 68 (FIG. 12), such as a pressurized fluid actuator from a pressurized fluid source (not shown), control the flow of pressurized fluid through pressurized fluid fittings 72 (FIG. 9) in fluid communication with a piston 70 (FIG. 12) that is secured to stabilizer portion 44. By controlling the flow of pressurized fluid to piston 70, selective control of movement in movement directions 74 of stabilizer portion 44 (and bar 51) is achieved. For example, as shown in FIGS. 12 and 19, release of articles 28 or separation of articles 28 from pair of jaws 27 of the article gripping system is achieved in response to pressurized fluid urging piston 70 sufficiently toward a base 63 (FIG. 12) of guide plate 62 in movement direction 74, as stabilizer portion 44, including bar 51 is simultaneously urged away from base 63 of guide plate 62. Stated another way, release of articles 28 or separation of articles 28 from pair of jaws 27 of the article gripping system is achieved in response to pressurized fluid urging piston 70 sufficiently toward the ends of pair of jaws 27 (FIG. 19) of guide plate 62 in movement direction 74, as stabilizer portion 44, including bar 51 is also simultaneously urged toward (and past, if required) the ends of pair of jaws 27, until articles 28 are separated from pair of jaws 27.

Referring back to FIGS. 4 and 6, a body 76 associated with movable jaw 24 of article gripping device 12 is now discussed. More specifically, referring to FIGS. 13-16, body 76 includes a counterbore 78 and a larger counterbore 80 formed in body 76, with counterbores 78, 80 forming a shoulder 82 therebetween. Counterbore 80 is sized to slidably receive a portion of a piston 116, movable in movement directions 118 between shoulder 82 and a stop plate 124 secured to body 76 by fasteners 126. As further shown in FIG. 14, a channel 84 is formed in body 76 in fluid communication with counterbore 78, with the end of channel 84 in proximity to the exterior surface of body 76 configured to receive a threaded insert 88. As further shown in FIG. 14, a channel 86 is formed in body 76 such that channel 86 and channel 84 are in fluid communication with each other, with opposed ends of channel 86 receiving a threaded inserts 88. A form of actuation 92, such as a source of pressurized fluid (not shown) urges piston 116 in movement directions 118 for controlling the position of jaw 24 (FIG. 16).

Figure 15:
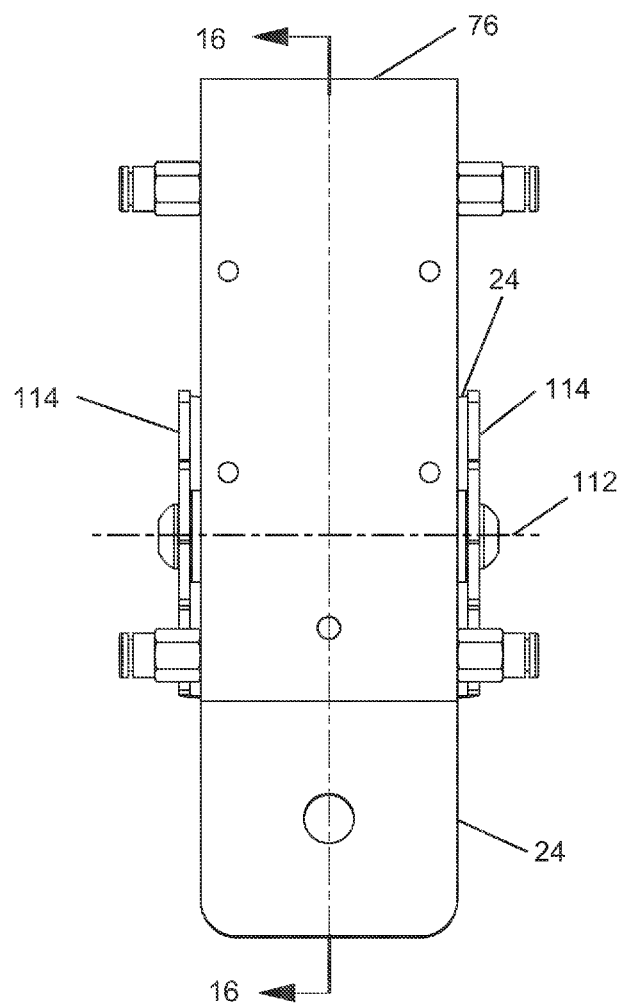
FIG. 15 is a cutaway back view of an exemplary article gripping device.
Figure 16:
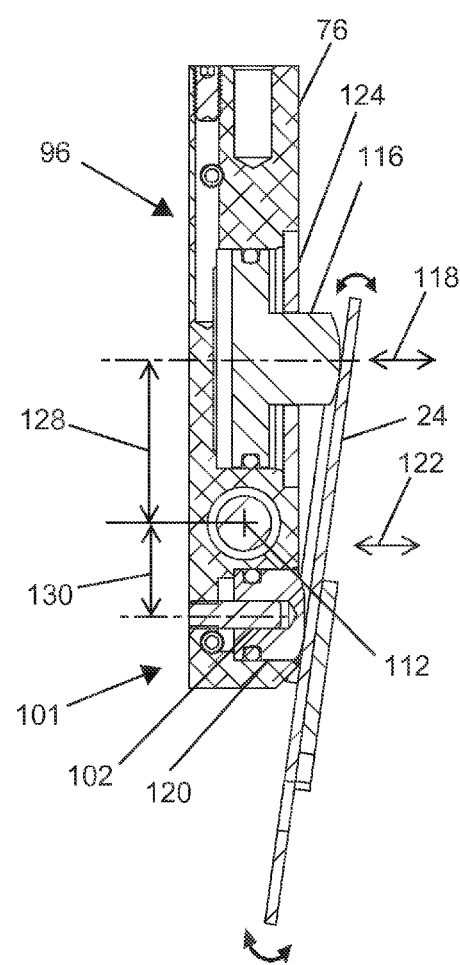
FIG. 16 is a cross section taken along line 16-16 of the article gripping device of FIG. 15.

Referring to FIGS. 13-16, body 76 includes a counterbore 96 and a larger counterbore 98 formed in body 76, with counterbores 96, 98 forming a shoulder 100 therebetween. Counterbore 80 is sized to slidably receive a portion of a piston 120 movable in movement directions 122 between shoulder 100 and movable jaw 24. As further shown in FIG. 14, a channel 94 is formed in body 76 in fluid communication with counterbore 96, with the opposed ends of channel 94 in proximity to the exterior surface of body 76 each configured to receive a threaded insert 88. As further shown in FIG. 14, a channel 86 is formed in body 76 such that channel 86 and channel 84 are in fluid communication with each other. A form of actuation 101, such as a source of pressurized fluid (not shown) urges piston 120 in movement directions 122 for controlling the position of jaw 24 (FIG. 16). Piston 120 is configured to slidably receive a guide 102 extending outwardly from counterbore 96 in a direction parallel to movement directions 122.

In one embodiment, forms of actuation, such as forms of actuation associated with moving each of the pistons is selectably variable to account for, for example, larger or heavier articles or for other reasons.

As further shown in FIGS. 14-16, body 76 includes an opening 104 configured to receive cylindrical sleeve 110. A bushing 106 of a pair of flanged bushings is received at each of opposed ends of cylindrical sleeve 110, with each flanged bushing 106 threadedly receiving a headed fastener 108 therethrough. As further shown in FIGS. 15-16, each flange 114 of a pair of opposed flanges 114 of movable jaw 24 is rotatably secured between a corresponding head of fastener 108 and flanged bushing 106. Stated another way, the movable jaw 24 is rotatably movable about an axis 112 comprising cylindrical sleeve 110, flanged bushings 106 and fasteners 108.

As shown in FIG. 16, the operation of movable jaw 24 is now discussed. In response to form of actuation 92 (pressurized fluid), piston 116 is urged outwardly away from body 76 in a movement direction 118 and into abutting contact with movable jaw 24 for gripping an article 28 (e.g., first position 60; FIG. 17.) In order to move from first position 60 to second position 61 (FIG. 18) for releasing article 28, in response to form of actuation 101 (pressurized fluid; FIG. 16), piston 120 is urged outwardly from body 76 in a movement direction 122 and into abutting contact with jaw 24. Substantially simultaneously with activation of form of actuation 101 (pressurized fluid) to piston 120, form of actuation 92 (pressurized fluid) is bled to the atmosphere to reduce resistance forces preventing jaw 24 from rotating toward second position 61. Conversely, substantially simultaneously with activation of form of actuation 92 (pressurized fluid) to piston 116, form of actuation 101 (pressurized fluid) is bled to the atmosphere to reduce resistance forces preventing jaw 24 from rotating toward first position 60. Rotational axis 112 is positioned between pistons 116, 120 such that the torsional forces applied to movable jaw 24 by the pistons urge movable jaw 24 in one of opposed rotational movements directions 122 about axis 112.

That is, the torsional force applied to jaw 24 by piston 116 (i.e., force applied to jaw 24 by piston 116 multiplied by a distance from axis 128), rotates jaw 24 about axis 112 toward a first position 60 (FIG. 17) such that article(s) 28 are gripped by a compressive force applied by pair of jaws 27. However, the torsional force applied to jaw 24 by piston 122 (i.e., force applied to jaw 24 by piston 122 multiplied by a distance from axis 130), rotates jaw 24 about axis 112 toward a second position 61 (FIG. 18) such that article(s) 28 are released by pair of jaws 27.

It is to be understood that in one embodiment, such as shown in FIG. 2, a pair of selectably movable (in directions 36) opposed compression sheets or sheets 34 may be vertically slidably movable to maintain precompressed respective widths 38 of corresponding article rows 30 (FIG. 4) of article array 32 (FIG. 4), such pre-compression occurring while the article rows 30 are arranged on article array forming area 204 (FIG. 1). For clarity, the article rows 30 are compressed in article array forming area 204 (FIG. 1) in a direction that is perpendicular to the movement directions 36 of the vertically slidable sheets 34. In FIG. 2, only one compression sheet 34 is shown. Maintaining pre-compression of the article rows 30 permits insertion of article gripping device 12 inside opening 212 of container 210 (FIG. 1). Upon release by the article gripping device of the article rows inside of the container, the articles return toward their uncompressed condition, resulting in the rows of articles more fully filling the container, resulting in a more stable arrangement of articles that are less susceptible to tipping.

Figure 20:
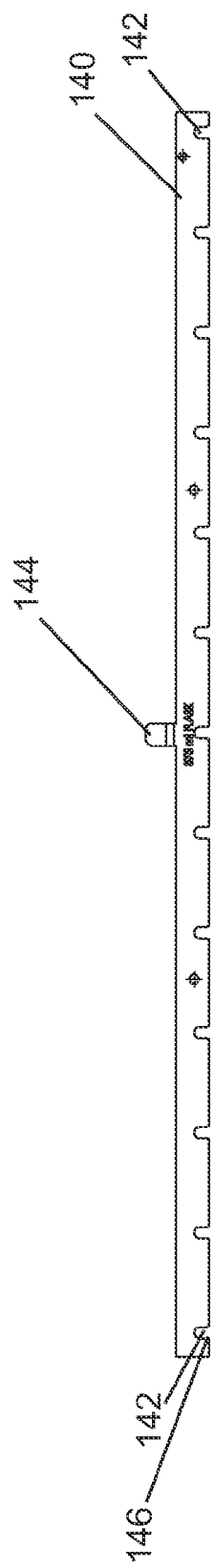
FIG. 20 is a front view of an exemplary reference bar for arranging articles.

It is to be understood the present disclosure permits the arrangement of each pair of jaws 27 corresponding to article(s) 28, such as an article row 30 to be easily manipulated. Moreover, for example, if the size of the container opening and/or the size of articles were to be changed for a production run, one or more reference bars, such as reference bars 140 may be used to permit precise manipulation of each pair of jaws relative to guide portion 18 (FIG. 3). For example, reference bar 140, composed of a suitable material could be used as an overlay over opposed sides of opposed mounting blocks 20 (FIGS. 4, 5 and 20). Reference bar 140 includes alignment features 142, such as slots, permitting adjustment of position locking handles 22 (loosening and retightening) without removal of associated pairs of jaws 27.

In one example, if the size of the containers 210 (FIG. 1) were to be changed, reference bars 140 associated with the particular container width would be used, the reference bars 140 including the desired spacing of the pairs of jaws 27; excess pairs of jaws 27 could easily be removed by loosening corresponding position locking handles 22 and then slidably removing the pair of jaws 27 from the guide portion 18 (FIG. 3). Once all reference features 142 of reference bars 140 have been aligned with corresponding position locking handles 22, the ratcheting position locking handles 22 for each pair of jaws 27 could then be re-tightened and operation resumed. By virtue of the reference bar of the present disclosure, precise positioning of the plurality of pairs of jaws 27 of the article gripping device is achievable without tools.

Figure 22:
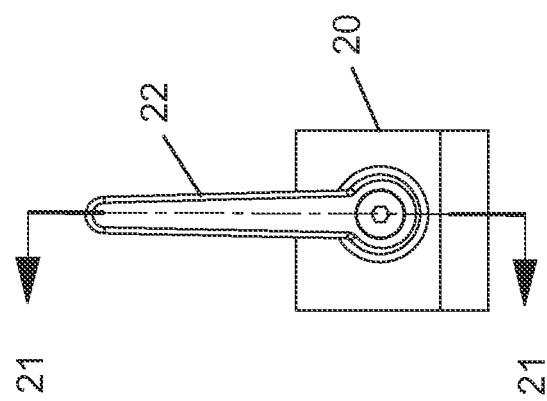
FIG. 22 is a side view of an exemplary mounting block.
Figure 21:
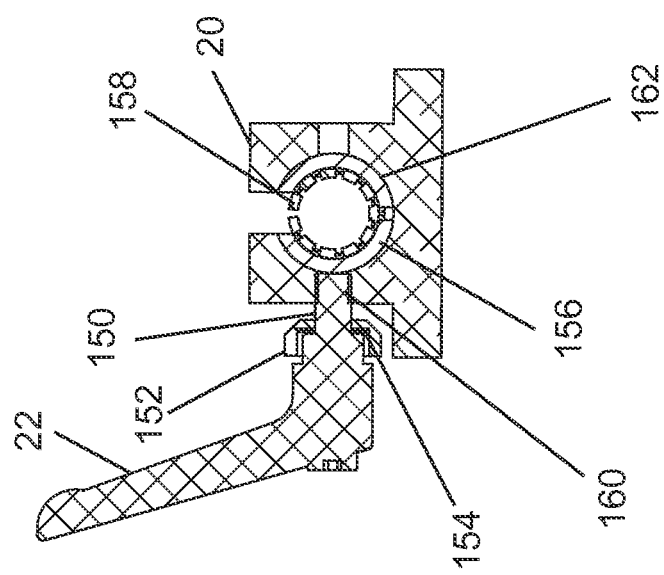
FIG. 21 is a cross section taken along line 21-21 of a mounting block of FIG. 22.

As shown in FIG. 3, article gripping device 12 includes a frame 14 having a pair of guides 16 having an enlarged end 17 extending outwardly from frame 14. In other embodiments, the number guides can be different than two. Each mounting block 20 of a pair of mounting blocks has an opening 21 that is slidably received by a corresponding end 17 of guide 16. As further shown in FIGS. 21-22, ratcheting position locking handles 22 include a cupped washer 152, a cone washer 154, such as a belleville washer and threaded fastener portion 150 extending through washers 152, 154 and threadedly engaging an opening 160 formed in mounting block 20. A bushing 156, composed of aluminum or other suitable material is inserted inside of an opening 162 formed in mounting block to receive the end 17 of guide 16 (FIG. 3). An additional bushing 158, composed of nylon or other suitable material is inserted inside of bushing 156.

In operation, ratcheting position locking handle 22 is actuated in a direction that brings the end of threaded fastener portion 150 into contact with bushing 160. Further actuation of ratcheting position locking handle 22 compressively deforms bushing 156, which likewise compressively deforms bushing 158 that is in contact with end 17 of guide 16 (FIG. 3). As a result of the combination of washers 152, 154, bushings 156, 158 and threaded fastener portion 150, upon sufficient activation and release of ratcheting position locking handle 22, the position of ratcheting position locking handle 22 will remain in position, i.e., not permitting inadvertent loosening of the ratcheting position locking handle 22. In addition, this arrangement also provides a stable, i.e., non movable relationship between mounting block 20 and guide 16 (preventing "wobbling"). As noted above, precise positioning of the plurality of pairs of jaws 27 relative to each other is achievable, as well as simultaneously securing each corresponding row of articles of the plurality of rows of articles of the article array to the article gripping device is also achievable, all without tools.

For purposes of the present disclosure, the term "tool" includes apparatus associated with preliminarily determining approximate positioning, such as a "ball park" measurement, requiring additional tasks or manipulation prior to more accurately positioning objects, and removable upon completion of the task. In contrast, reference features 142 of the reference bars 140 of the present disclosure directly provide such precise positioning of the one or more pairs of jaws 27 relative to one another by simply sliding the position locking handles 22 until the position locking handles 22 are aligned with the corresponding reference features 142, upon such alignment, the reference features 142 can then be fully engaged with the position locking handles 22 and tightened, and the task is completed without further secondary alignment concerns. Outwardly directed tapering features 146 further facilitate alignment of jaws 27. In one embodiment, tapering features 146 are straight chamfer, while in another embodiment, at least one tapering feature may be curved. The reference bar 140 is intended to remain secured to the apparatus gripping device during operation. In one embodiment, forces associated with loosening and tightening of the position locking handles are of sufficiently reduced torque as to be manually achievable by a competent operator of ordinary physical strength and dexterity.

In one embodiment, reference bar 140 includes an alignment feature 144 (e.g., FIG. 20) in which the alignment feature is positioned at a predetermined position of the article gripping device, such as centered relative to the article gripping device. This alignment feature permits components of the article gripping system, including, but not limited to a photo sensor or other type of sensing device to become properly integrated with the palletizer.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An article gripping device comprising:
   a pair of jaws comprising at least one movable jaw, the jaws of the pair of jaws movable relative to each other between a first position for gripping an article and a second position associated with release of the article;
   the at least one movable jaw has at least two forms of actuation to achieve the first position and the second position;
   wherein the device comprises a body;
   the at least two forms of actuation are positioned between the body and the at least one movable jaw;
   a first piston in fluid communication with a first compressed fluid source; and
   a second piston in fluid communication with a second compressed fluid source;
   wherein during operation of the device, the only movable components are the first piston, the second piston and the at least one movable jaw.

2. The device of claim 1, wherein at least one of the at least two forms of actuation are selectably variable.

3. The device of claim 1, wherein the at least one movable jaw is urged into rotational movement about an axis by the at least two forms of actuation.

4. The device of claim 1, wherein the at least two forms of actuation each include being in fluid communication with a pressurized fluid source,
   wherein an axis is positioned between the at least two forms of actuation.

5. The device of claim 1, further comprising:
   a stabilizer positioned between the pair of jaws and extending toward gripping ends of the pair of jaws, the stabilizer comprising:
      a bar resiliently extending in proximity of the gripping ends of the pair of jaws, the bar forming an aligning contact with an end of each article of a plurality of articles during manipulation of the plurality of articles by the device.

6. The device of claim 5, wherein the bar is resiliently movable only in a direction substantially perpendicular to a rotational axis of the at least one movable jaw by a third form of actuation.

7. The device of claim 6, wherein the bar is additionally selectably movable only in a direction substantially perpendicular to a rotational axis of the at least one movable jaw by a fourth form of actuation.

8. An article gripping system for releasably manipulating a row of articles from a first position to a second position inside of a container, the article gripping system comprising an article gripping device comprising:
   a pair of jaws comprising at least one movable jaw, the jaws of the pair of jaws movable relative to each other between the first position for gripping a row of articles and the second position associated with release of the row of articles;
   the at least one movable jaw has at least two forms of actuation to achieve the first position and the second position;
   wherein upon application of a compressive force to the at least one movable jaw by the at least two forms of actuation, the compressive force applied to the row of articles by the pair of jaws in the first position is a distributed force;
   wherein the distributed force is generated by a plurality of force generating assemblies, each force generating assembly comprising:
      a body positioned between the pair of jaws, each body having
      a first piston movably received in the body, the first piston in fluid communication with a first compressed fluid source for applying a force to the at least one movable jaw; and
      a second piston movably received in the body, the second piston in fluid communication with a second compressed fluid source for applying a force to the at least one movable jaw.

9. The system of claim 8, wherein during operation of the device, the only components movable relative to the body are the first piston, the second piston and the at least one movable jaw.

10. The system of claim 8, wherein the row of articles includes a plurality of rows of articles forming an array of articles, each row of articles being manipulated by a corresponding article gripping device.

11. The system of claim 8, further comprising:
   a stabilizer extending outwardly from the body, the stabilizer comprising:
      a bar resiliently extending outwardly from the body, the bar forming an aligning contact with an end of each article of the plurality of articles during manipulation of the plurality of articles by the device.

12. The system of claim 11, wherein the bar is resiliently movable only in a direction substantially perpendicular to a rotational axis of the at least one movable jaw by a third form of actuation.

13. The system of claim 12, wherein the bar is additionally selectably movable only in a direction substantially perpendicular to a rotational axis of the at least one movable jaw by a fourth form of actuation.

14. The system of claim 8, further comprising a reference bar securable to the article gripping device, the reference bar having first alignment features for precisely positioning the article gripping device relative to the article gripping system, which precise positioning being achievable without tools.

15. The system of claim 8, further comprising a reference bar securable to the article gripping device, the reference bar having first alignment features for precisely positioning the article gripping device relative to the article gripping system, which precise positioning being manually achievable.

16. The system of claim 8, further comprising a reference bar securable to the article gripping device, the reference bar having a second alignment feature for precisely positioning the article gripping device relative to the first position and the second position, the reference bar having indicia permitting the system which precise positioning being manually achievable.

17. The system of claim 8, further comprising opposed vertically sliding sheets for maintaining a precompressed row of articles.

18. A method for accommodating an article array formed of a plurality of rows of articles by an article gripping system, in which rearrangement of portions of the article gripping system is required, comprising:
providing the article gripping system comprising an article gripping device comprising:
a pair of jaws comprising at least one movable jaw, the jaws of the pair of jaws movable relative to each other between a first position for gripping a row of articles and a second position associated with release of the row of articles; and
the at least one movable jaw has at least two forms of actuation to achieve the first position and the second position;
wherein the device comprises a body;
the at least two forms of actuation are positioned between the body and the at least one movable jaw;
a first piston in fluid communication with a first compressed fluid source;
a second piston in fluid communication with a second compressed fluid source;
wherein during operation of the device, the only movable components are the first piston, the second piston and the at least one movable jaw; and
securing a reference bar to the article gripping device, the reference bar having an alignment feature for precisely positioning each corresponding row of articles of the plurality of rows of articles of the article array, which precise positioning being achievable without tools.

19. The method of claim 18, wherein securing the reference bar further includes simultaneously securing each corresponding row of articles of the plurality of rows of articles of the article array to the article gripping device without tools.

* * * * *